United States Patent Office 3,563,106
Patented Feb. 16, 1971

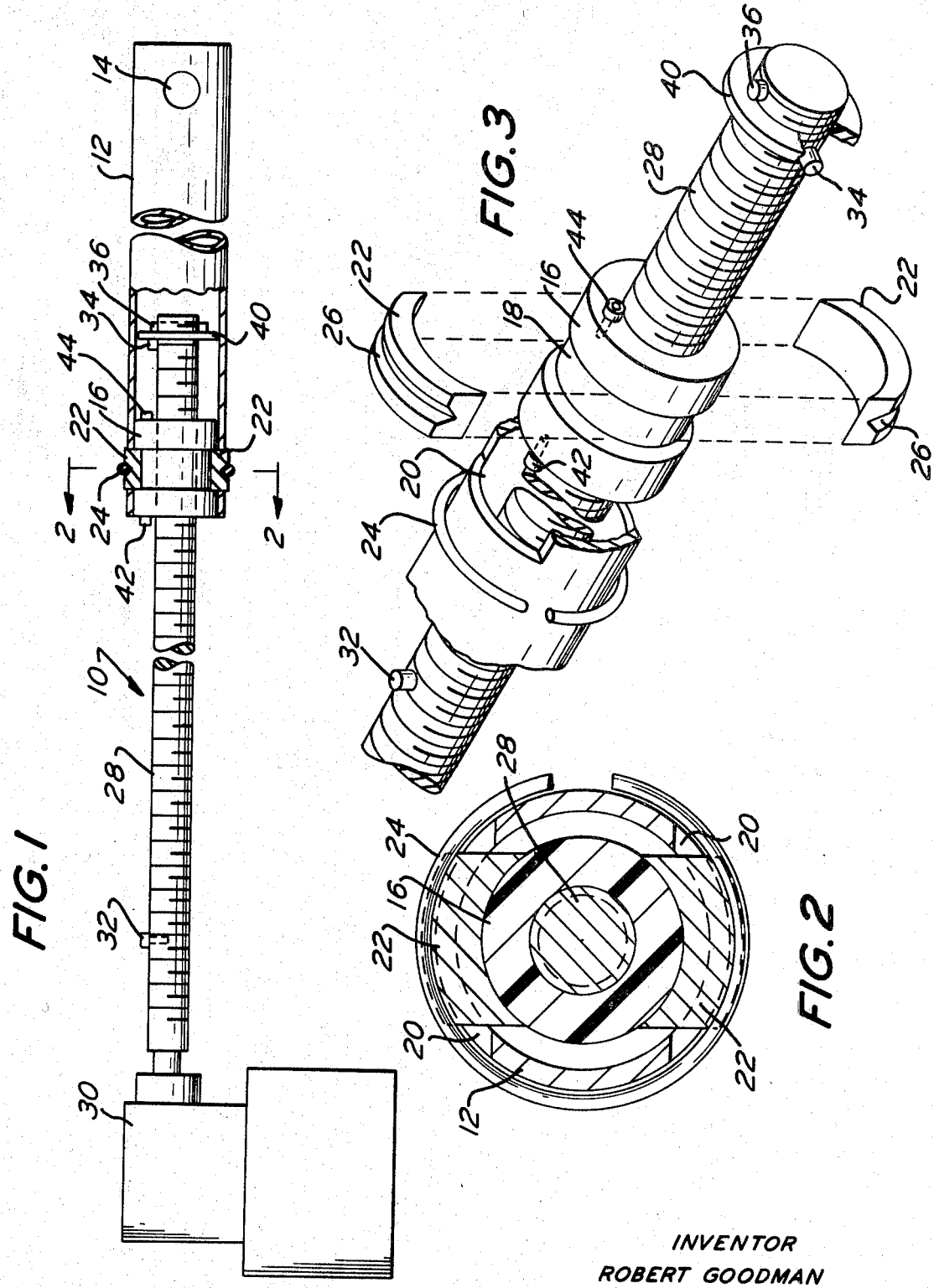

3,563,106
DEVICE FOR TRANSLATING ROTARY MOTION INTO LINEAR MOTION
Robert Goodman, 5325 Westminster Ave.,
Philadelphia, Pa. 19131
Filed Sept. 29, 1969, Ser. No. 861,753
Int. Cl. F16h 1/18
U.S. Cl. 74—424.8
5 Claims

ABSTRACT OF THE DISCLOSURE

A device for moving a member of a combination of parts relative to other members of the combination by means of linear movement of a threaded rod. The rod is threadedly engaged with a nut, the nut being positioned within a tubular rod. The nut is normally held by brake shoes against rotation relative to the tubular rod so that the threaded rod is movable through the nut. However, when a lug at either end of the rod engages a corresponding lug on the nut, continued rotation of the rod exerts a rotational force on the nut sufficient to cause the nut to rotate relative to the tube. This acts to halt longitudinal movement of the threaded rod relative to the tubular rod.

---

This invention relates to a nut and screw assembly for translating rotary motion into linear motion, and it more particularly relates to an assembly of the aforesaid type wherein the linear motion is automatically halted after a predetermined linear movement has been effected.

The present invention constitutes an improvement over the device disclosed in applicant's Pat. No. 3,277,-736, dated Oct. 11, 1966. The device shown in that patent is similar to that of the present invention in that it comprises a tubular rod and a screw-threaded rod wherein the screw-threaded rod extends into the tubular rod and is movable relative thereto. The movable rod is provided with stop means, such as radially extending lugs, pins or the like, adjacent opposite ends, these lugs being adapted to engage with corresponding lugs or pins extending axially of a nut threadedly positioned on the movable rod. The nut is normally held in frictional engagement with the inner wall of the hollow rod so that the threaded rod is threadedly movable through the nut. However, when a lug on the threaded rod engages a lug on the nut, continued rotational movement of the threaded rod causes the nut to rotate relative to the hollow rod, thereby halting further longitudinal movement of one rod relative to the other.

The above-described device provides a highly satisfactory performance. However, it is an object of the present invention to simplify the construction of this device and to increase its efficiency, while maintaining the same effective functioning thereof.

Other objects and many of the attendant advantages of the present invention will be readily appreciated as the same becomes better understood by reference to the following description when read in conjunction with the accompanying drawings wherein:

FIG. 1 is an elevational view, partly broken away, of a device embodying the present invention.

FIG. 2 is a sectional view taken on line 2—2 of FIG. 1.

FIG. 3 is a partially exploded, perspective view of the device.

Referring now in greater detail to the various figures of the drawing wherein similar reference characters refer to similar parts, there is shown an assembly, generally designated 10, which comprises a hollow, tubular shaft 12 having a transverse aperture 14 at one end for holding a rivet, bolt, screw, or the like, for pivotally connecting the shaft to a member to be actuated, said member being linearly movable by the linear movement of the shaft 12.

Positioned within the tube 12 is a nut 16, preferably constructed of a material having a low coefficient of friction. The nut 16 is provided with a central peripheral groove 18 on its outer surface, this groove being bounded by opposed land portions. These land portions are of such diameter that they snugly fit within the hollow tube 12.

The tube 12 is provided with a pair of oppositely-disposed slots 20. Positioned within each slot 20 is a curved brake shoe 22. These shoes 22 are preferably made of the same material as the nut 16 and are of a size and shape to snugly fit within the groove 18 of the nut. When positioned in the groove, the shoes extend through the respective slots 20. A clamping ring 24 is adapted to be releasably positioned around the tube 12 and is engaged in the grooves 26 provided on the outer peripheral surface of the shoes 22.

A threaded rod 28 extends into the tube 12 and is threadedly engaged with the nut 16.

The shoes 22 serve a double function, one function being to act as a braking means to prevent rotation of the nut 16 within the tube 12 under ordinary threaded movement of the rod 28 relative thereto, and the other being to act as axial restraining means to prevent axial movement of the nut 16 relative to the tube 12. However, when a positive rotational force, over and above the threaded rotational movement of the rod is exerted, such force is sufficient to overcome the pressure of the brake shoes 22 and the nut is rotatable relative thereto. As was explained in Pat. No. 3,277,736, this is accomplished because of the relatively large surface area of the outer periphery of the nut as compared to the fine threads on its interior bore, and because the threads also have a low coefficient of friction since they are constructed of the same material as the nut and brake shoes.

The threaded rod 28 may be rotated by any desirable operating means, but is herewith shown operatively connected to a reversible electric motor 30 of standard design. The rod 28 is further provided with a radial lug 32 adjacent one end and a similar radially extending lug 34 adjacent the other end. It is, of course, to be understood that these lugs can be placed at any position along the rod 28 as desired, although when the lug 34 is placed near the end, as shown, it also serves, in combination with a lug 36, to hold a disc 40 in place. This disc 40 acts as a movable cover or guard to protect the working parts within the tube 12 from dirt, grease, flying particles, etc.

The nut 16 is also provided with a pair of oppositely-extending lugs 42 and 44. These lugs extend axially of the nut and are adapted to be engaged by the corresponding lugs 32 and 34 when either one or the other of these latter lugs reach the vicinity of the corresponding radial lugs upon axial threaded movement of the rod 28 in one direction or the other.

When the lug 32 engages the lug 42 or when the lug 34 engages the lug 44, continued rotation of the rod 28 exerts a rotational force through the lugs sufficient to overcome the braking action of the shoes 22. Thereupon, the nut 16 turns with the rod 28 and further relative axial movement between the tube 12 and rod 28 is halted.

It is to be understood that although the above description and the drawing indicates that the tube 12 is adapted to be connected to the part to be moved and the rod 28 is connected to the motor, the reverse arrangement is equally feasible.

The present device, by utilizing the brake shoes 22, obtains a more positive braking means on the nut than was possible in the device of Pat. No. 3,277,736 where the only frictional engagement was between the nut and the tube wall. These brake shoes also permit elimination of the transverse pins used in the prior patent to restrain axial movement of the nut in the tube. These pins tended to loosen during operation of the device and when they loosened or fell out, the device became inoperative. This is not possible in the present device where the shoes 22 are held under the positive pressure of the clamping ring 24.

The invention claimed is:

1. A mechanical movement device comprising a first shaft and a second shaft, said shafts being operatively connected for axial movement relative to each other, the first shaft being screw-threaded and the second shaft being held against rotation and having a nut threadedly engaged with said first shaft, said nut being axially fixed relative to said second shaft, restraining means normally holding said nut rotationally fixed relative to said second shaft whereby relative rotation between said first shaft and said nut provides relative axial movement between said first and second shafts, and restraint overcoming means on said first shaft for overcoming said restraining means upon predetermined axial movement of said shafts relative to each other, the overcoming of said restraining means causing said nut to rotate with said first shaft relative to said second shaft to discontinue relative axial movement of said shafts, said restraining means comprising at least one brake shoe, said nut having a peripheral groove on its outer surface, said brake shoe being engaged within said groove, and means retaining said brake shoe in said groove.

2. The device of claim 1 where said brake shoe extends through a corresponding slot in said second shaft to prevent axial movement of said nut relative to said second shaft.

3. The device of claim 1 wherein said second shaft is tubular and said nut is provided therewithin, said slot being provided in the tubular wall of said second shaft, and said brake shoe extending through said slot.

4. The device of claim 1 wherein said means retaining said brake shoe in said groove is a clamping ring.

5. The device of claim 1 wherein there are a plurality of brake shoes.

References Cited

UNITED STATES PATENTS 3,479,890   11/1969   Howell _____ 74—424.8X

LEONARD H. GERIN, Primary Examiner